United States Patent [19]

Goldstein

[11] 4,068,526

[45] Jan. 17, 1978

[54] ELECTRONIC THERMOMETER

[75] Inventor: Harold Goldstein, Westbury, N.Y.

[73] Assignee: Control Electronics Co., Inc., Farmingdale, N.Y.

[21] Appl. No.: 599,971

[22] Filed: July 29, 1975

[51] Int. Cl.² ............................................. G01K 7/24
[52] U.S. Cl. ................................................ 73/362 AR
[58] Field of Search .................................. 73/362 AR

[56] References Cited

U.S. PATENT DOCUMENTS

| | | | |
|---|---|---|---|
| 3,217,144 | 11/1965 | Hinnah | 73/362 AR X |
| 3,311,842 | 3/1967 | Beck | 73/339 R X |
| 3,702,076 | 11/1972 | Georgi | 73/362 AR |
| 3,822,598 | 7/1974 | Brothers et al. | 73/362 AR |
| 3,872,726 | 3/1975 | Kauffeld et al. | 73/362 AR |
| 3,882,481 | 5/1975 | Turner | 73/362 AR |
| 3,906,796 | 9/1975 | Dumbeck | 73/362 AR |

Primary Examiner—Richard C. Queisser
Assistant Examiner—John S. Appleman
Attorney, Agent, or Firm—Scully, Scott, Murphy & Presser

[57] ABSTRACT

An electronic circuit for use with a thermistor-type thermometer which makes only two measurements and provides a multiple temperature scale capability, a low-power indicator, a simple counting circuit and an enabling control circuit. The thermistor-type thermometer provides a signal having a pulse rate which varies with the temperature sensed and the electronic circuit of the invention operates on this signal to visually display the final temperature after only thirty seconds. Decade counters and logic gates are used with a crystal controlled oscillator to provide counting and timing signals as well as enabling signals required by a specialized temperature prediction algorithm.

23 Claims, 4 Drawing Figures

1

ELECTRONIC THERMOMETER

BACKGROUND OF THE INVENTION

The recent trend toward the electrification of physical measuring devices has carried over into the health services field. Electronic timers for pulse taking, high power acoustic amplifiers for fetal heart sensing and electronic temperature sensors have become common place. One such electronic temperature sensor is disclosed in my co-pending application for an "Electronic Temperature Computer" Ser. No. 392,961, now U.S. Pat. No. 3,978,325, which utilizes a relatively inexpensive thermistor bead and an electronic prediction circuit to rapidly determine a patient's temperature. Although many of these prior systems utilized digital techniques the components and circuit elements were not available to permit both high-speed and miniaturization. For the most part, it was necessary to use discrete components and discrete logic elements when designing and fabricating these rather sophisticated health-oriented electronic circuits. Because of the size limitations it has not always been possible to include the desired number of functions in a single package.

It is therefore an object of the present invention to provide an improved temperature sensor utilizing digital techniques.

It is another object of the present invention to provide an improved temperature sensor which sense temperature in a short period of time and provide an output in either centigrade or fahrenheit degrees.

It is a further object of the present invention to provide an improved temperature sensor utilizing inexpensive thermistors and readily available electronic components.

SUMMARY OF THE INVENTION

The present invention provides electronic apparatus for use with an electronic thermometer which needs to make only two measurements in order to predict a final temperature. The present invention is intended for use in making medical temperature measurements and more particularly for use with a thermistor-type probe which is inserted into a patient. The electronic thermometer utilizes an algorithm which is based upon the response curve of a typical thermistor bead or element. The algorithm requires that two measurements must be taken for specific time periods and just as importantly, must be taken at critical, predetermined, times. The present information provides to apparatus practicing this algorithm the capability of measuring temperatures on both the fahrenheit and centigrade scale. It also provides apparatus for indicating a low battery voltage condition and, more importantly, teaches specialized counting and logic circuitry for performing the algorithm in the optimum manner. Furthermore, the invention is intended to use readily available electronic devices to both count and display the final temperature of the patient.

DETAILED DESCRIPTION OF THE PREFERRED EMBODIMENT

Figure 1:
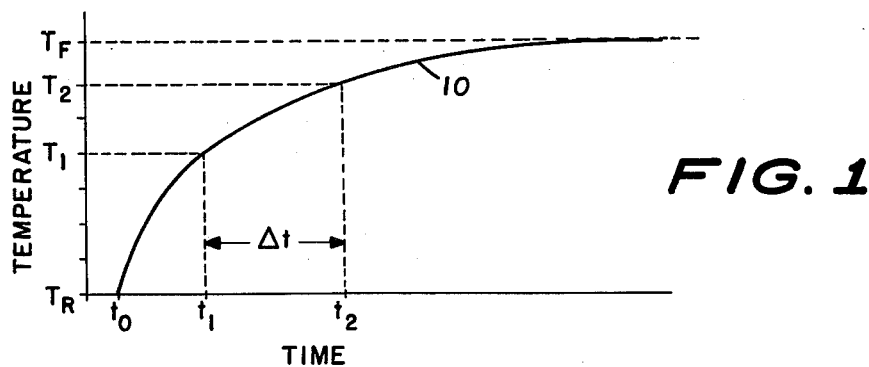
FIG. 1 is a characteristic curve of the temperature response of a typical thermistor-type temperature sensor.

Referring to FIG. 1, a typical response curve of a commercially available thermistor-type temperature sensor is shown. The ordinate axis T represents temperature and the abscissa axis $t$ represents time. The actual response curve 10 is generally referred to as being exponential, although it need not necessarily be exactly a true exponential curve. Since it is an object of the present invention to permit the use of relatively inexpensive readily available thermistors, these thermistors will of necessity not be capable of making accurate measurements over an extended temperature range. Accordingly, the thermistor response may not drop below a value which may be termed the at-rest response, shown as $T_R$, and similarly the response will never quite achieve the true final temperature shown at $T_F$, but will only approach it. As was taught in my aforementioned copending application, it is necessary to take only two measurements at predetermined times in order to accurately and rapidly predict the final value of $T_F$. These well-placed measurements are shown as $T_1$ at $t_1$ and $T_2$ at time $t_2$. Inherent in the knowledge of the specific times at which the measurements should be made is the time separation between the two, shown here as $\Delta t$. As was taught in my aforementioned copending application, the value of $\Delta t$ may be expressed as a function of the thermal response, $\tau$, of the particular thermistor being used. This expression is:

$$\Delta t = \tau \ln 2 \qquad (1)$$

Assuming that a typical thermal response value is 20, then equation (1) yields a $\Delta t$ of approximately 14 seconds, a time which is sufficiently short for use in the present invention. Although speed is of great importance in the present invention, it is not always advantageous to take the first measurement too early after insertion of the probe into the patient.

Figure 2:
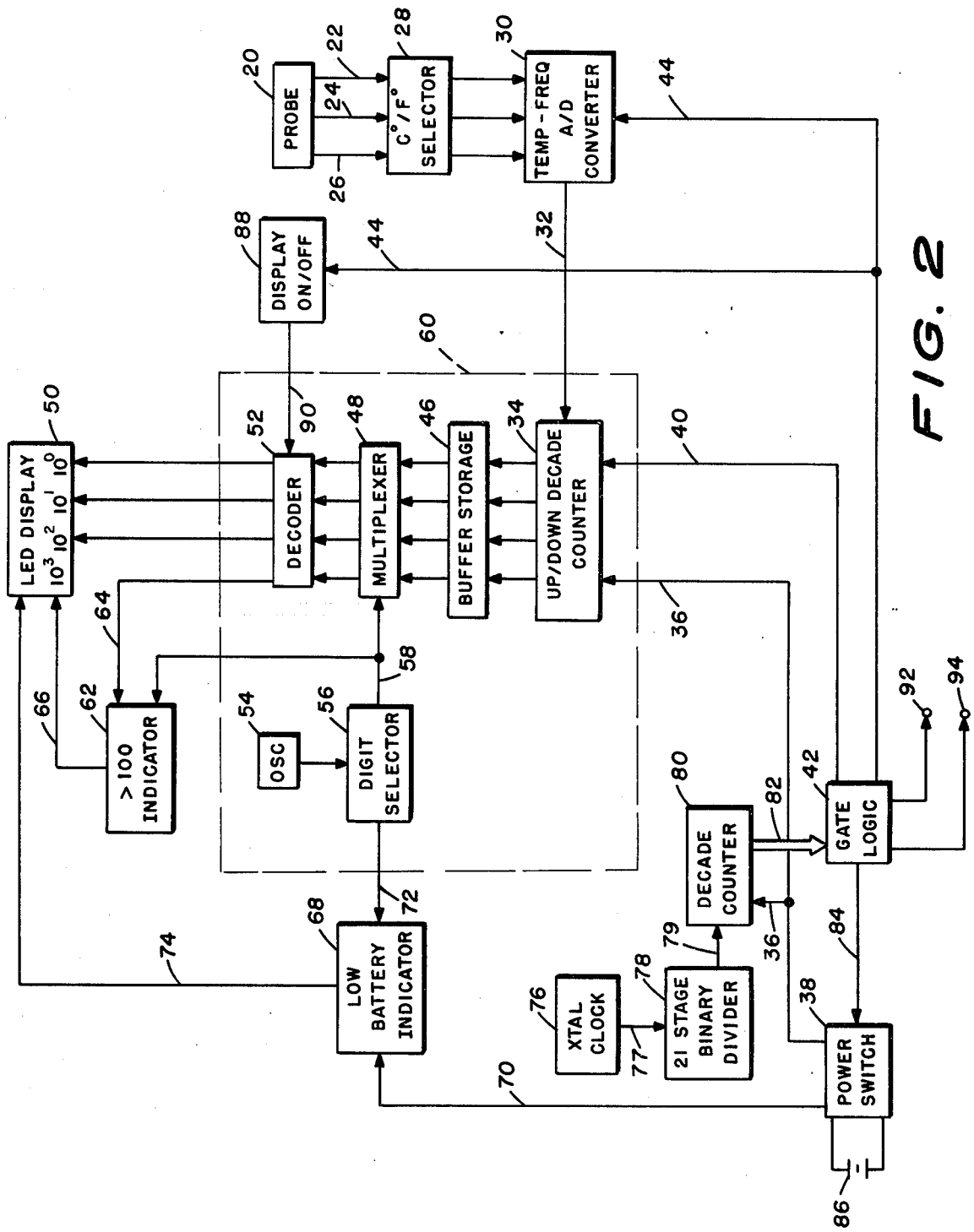
FIG. 2 is a block diagram of a preferred embodiment of the termperature sensing unit according to the present invention.

Referring now to FIG. 2, a preferred embodiment of the invention is shown in block diagram form. The thermistor probe 20 which is inserted into the patient's body produces a corresponding change in resistance at its output lines 22, 24 and 26 which are connected to the centigrade/fahrenheit (C/F) selector unit 28. The C/F selector unit 28 is electrically connected to a Temperature-Frequency Analog to Digital Converter 30, which is shown in more detail in FIG. 3. The A/D converter 30 operates to change the temperature related analog voltage provided by the change in resistance into a digital signal which now has the temperature information expressed as a pulse rate (i.e., frequency). The heart of the A/D converter 30 is an oscillator whose period of oscillation is controlled by the resistance of the thermistor located in the probe 20. The digital signal which now contains the temperature information in its pulse rate is fed on line 32 to a conventional up/down decade counter 34. The decade counter 34 is cleared or reset by a signal on line 36 from the power switch 38, each time the unit is desired to be used, e.g., each time the power switch 38 is actuated. The mode of the up/down decade counter 34 is controlled by an up/down command signal on line 40 which is produced by a gate logic unit 42. The gate logic unit 42 is shown in greater detail in FIG. 4.

Since the present invention relies upon equation (1) to provide an approximation of the temperature, the time between the two temperature measurements ($\Delta t$) must be controlled. The Temperature-Frequency converter is enabled at selected times by a signal appearing on line 44 which is produced by the gate logic unit 42. As derived in my copending application noted above, the final temperature which is arrived at is equal to two times the second temperature measurement ($T_2$) minus the first temperature measurement ($T_1$). Of course, since $T_1$ occurs first in order to subtract it, the counter 34 is first set to count down by a command on line 40. The gate logic unit 42 then produces an enable signal on line 44 and $T_1$ is entered into the counter 34 via line 32. In order to enter twice the value of $T_2$, and since the temperature is represented by a continuous pulse stream, it is only required to let the signal on line 32 enter the counter 34 for a time which is two times the time during which $T_1$ was permitted to enter. A time of one second for $T_1$ and two seconds for $T_2$ has been found to provide satisfactory results. Therefore, when the signal on line 44 enables the converter 30 for a two second time period the mode control signal on line 40 must command the counter 34 to count up. The counter 34 will then contain a number of pulses which represents two times the second temperature measurement minus the first temperature measurement. The contents of the counter 34 is then fed in parallel to a conventional buffer storage unit 46 and then to a multiplexer 48. The multiplexer 48 serves to reduce the amount of power necessary to drive the light emitting diode (LED) display 50 in a manner which is well-known in the art. Upon being decoded in a conventional decoder 52 the counter contents may then be displayed by the LED display 50. An oscillator 54 and a digit selector 56 serve as the required display driver and are connected to the multiplexer 48 by line 58. The counter 34, buffer 46, multiplexer 48, decoder 52, oscillator 54, and digit selector 56 are commercially available in a simple integrated circuit package indicated by the dashed line 60. It is well-known how to connect these functional units to receive pulsed signals and to display the information contained in the pulsed signals.

Since the preferred embodiment of the present invention is intended to measure the body temperature of a human, the display must be capable of displaying numbers greater than ninety-nine. However, the hundreds digit display will only be required to display a one and since power conservation is important and it is also undesirable to display a temperature as "098.6," the present invention provides a means to blank the one hundreds digit unless it is displaying a one. An over one-hundred indicator 62 is connected to the most significant-digit signal on line 64 from the decoder 66 and also to line 58 from the digit selector 56. The over one-hundred indicator 62 may simply be a logic gate which will produce an enable signal on line 66 for enabling the hundreds digit only when it is required to display a one, and leaving it disabled to prevent display of a zero.

To prevent the possibility of erroneous readings due to insufficient voltage, a low-battery indicator 68 is provided. The battery indicator 68 may be a comparator which compares the internal bias voltage, $V_{cc}$, on line 70 to a fixed voltage drop across a diode or the like. The low-battery indicator also has an input connected to the display driver unit output on line 72 and has an output line 74 connected to all the decimal points in the LED display 50. Upon detection of the voltage on line 70 dropping below a predetermined level, the display driver is connected through line 72, the indicator 68 and line 74 to all the decimal points in the display 50 and they are continuously illuminated, thereby alerting the operator that the battery voltage is below the minimum level.

In the preferred embodiment it is desired to have completed the measurement prediction function within thirty seconds and as already discussed it is necessary to know the exact times that the two temperature measurements are taken. Therefore, an accurate timing means must be supplied. A crystal controlled oscillator or clock 76 is provided which produces a signal on line 77 having a frequency of 2,097,152 pulses per second. This 2,097,152 Hz signal is then fed to a 21 stage binary divider 78, thereby producing an accurate 1.0 second clock pulse train. This pulse train is then fed on line 79 to a group of decade counters 80, which are shown in greater detail in FIG. 4. The decade counters 80 are then connected through multiple lines shown at 82, and are cleared by the same signal on line 36 which is used to clear the counter 34. The clock 76, the decade counters 80 and the gate logic unit 42 act together to provide the internal timing necessary to enable the temperature-frequency analog-to-digital converter 30 to produce the signal on line 32 which actually contains the predicted temperature value.

Figure 4:
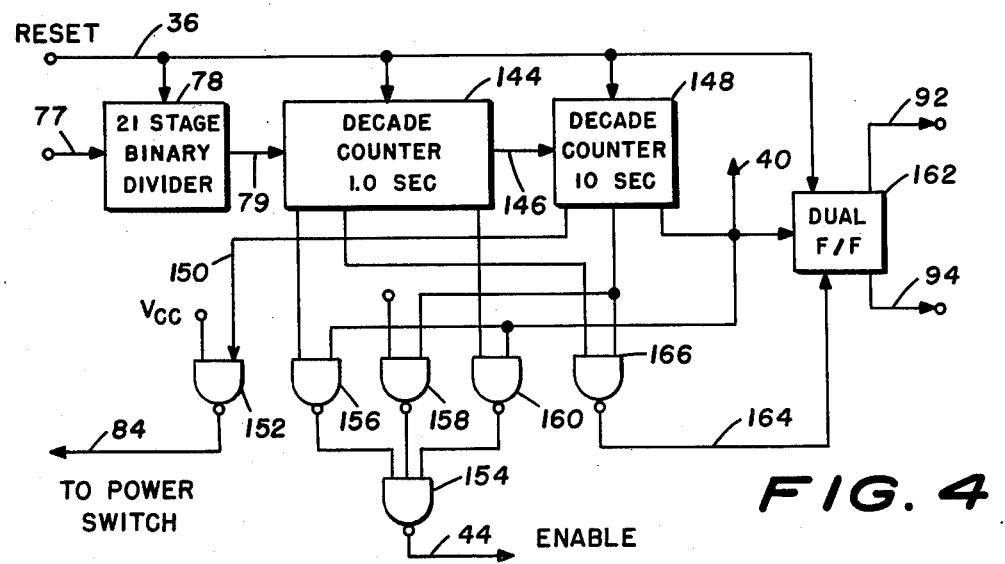
FIG. 4 is a logic diagram of the Gate Logic unit as shown in the apparatus of FIG. 2.

The gate logic unit 42, which is shown in more detail in FIG. 4, in addition to providing the up/down command on line 40 to the counter 34 also provides a power-off command on line 84 which is fed to the power switch 38. This command serves to cut off the power to save the battery 86 after a predetermined time period has elapsed. An acceptable time period for power cut-off has been found to be 40 seconds. The gate logic unit 42 is also used to control a display on/off switch 88 which produces an enabling signal on line 90 which is connected to the LED display decoder 52. This enabling signal serves to provide a blanking pulse to the decoder 52 so that the display does not show the temperature rising, but instead shows only the final predicted temperature.

The gate logic unit 42, the decade counters 80, and the crystal controlled clock 76 can also provide timing signals are preselected intervals. For example, a signal may be produced on line 92 after 15 seconds have elapsed and another signal may be produced on line 94 after 30 seconds have elapsed. These signals may be connected to display lights or buzzers for use in pulse taking or other chores requiring accurate timing.

Figure 3:
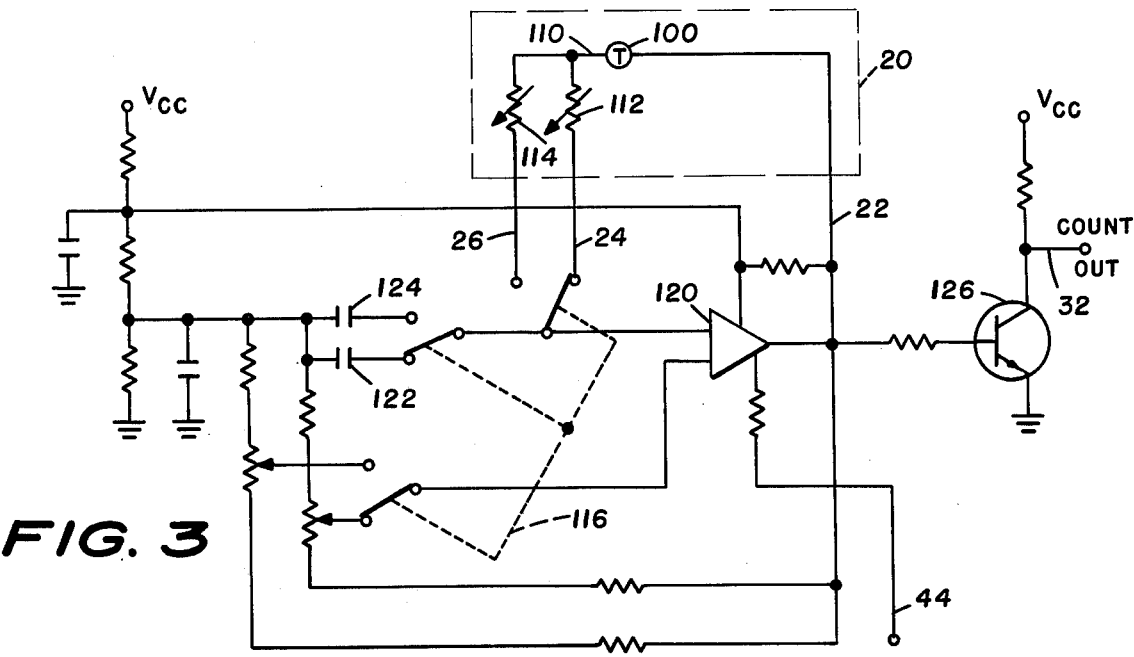
FIG. 3 is a schematic diagram of a centigrade to fahrenheit selector unit as used in the apparatus of FIG. 2.

Referring now to FIG. 3, the probe, centigrade to fahrenheit selector and temperature-frequency analog-to-digital converter are shown in more detail. The probe 20 contains a single thermistor element or bead 100 and has one direct output lead 22. The other output lead 110 of the thermistor is connected to two variable resistors 112 and 114 which act to calibrate the thermistor 100. Two variable resistors are necessary because the thermistor is being used for two separate temperature scales. The centigrade/fahrenheit selector 28 consists of a manual action triple-pole double throw switch shown at 116. The A/D converter 30 is actually an oscillator whose frequency of oscillation is dependent upon R and C, and in this case the resistance is caused to be varied. A conventional operational amplifier 120 is connected in the well-known manner to form a free-running multivibrator except that the thermistor probe 20 is inserted in the feedback path. Hence the frequency of oscillation or pulse rate will vary with the temperature sensed by the thermistor bead 100. Furthermore, since the present invention produces a signal having a number of pulses representing a temperature in one of two different scales, the amplifier 120 must oscillate at two different rates. To achieve this, in addition to the two variable resistors 112 and 114 in the feedback path, there are two separate capacitors 122 and 124 connected through the selector switch 116 to the amplifier 120. The converter 30 of FIG. 2, is enabled, i.e., the operational amplifier 120 is made to oscillate by an enable signal appearing on line 44. As mentioned previously this signal is produced by the gate logic unit 42 and turns on the oscillator at a selected time for 1 second, then at a predetermined later time again turns on the oscillator for 2 seconds. The output of the oscillator is fed through a conventional amplifier 126 before being fed on line 32 to the up/down counter 34 of FIG. 2.

Referring now to FIG. 4 the decade counters and gate logic unit are shown in more detail. The 2,097,152 Hz signal on line 77 from the crystal controlled clock, 76 of FIG. 2, is fed to the binary divider 78 which produces counts in 1.0 second increments, i.e., it will produce a signal on line 79 every 1.0 seconds. This signal is fed to a decade counter 144 which now counts in 1 second intervals and produces an overflow signal or carry on line 146 every 10 seconds. The clock signal is then fed to the final decade counter 148 which counts in 10 second intervals. The decade counters 144 and 148 and the binary divider 78 are reset by the reset signal on line 36 from the power switch. This reset signal, however, originates in the decade counters since, as previously mentioned, the power switch is turned off after 40 seconds have elapsed. Decade counter 148 is then tapped at the number four tap and this signal is fed on line 150 to an AND gate 152 which forms part of the gate logic unit. The second input to the AND gate 152 is the bias voltage $V_{cc}$ and when both signals are present a signal is produced on line 84 which serves to turn the power switch off. As mentioned previously, an enable signal is required to be present at the temperature-frequency converter for 1 second after 15 seconds have elapsed and also for 2 seconds after 30 seconds have elapsed. These enable signals must appear on line 44 which is fed to the temperature-frequency converter, 30 of FIG. 2, and are produced by a three-input AND gate 154. There are an additional three AND gates 156, 158 and 160 whose outputs are connected to the AND gate 154. These AND gates 156, 158 and 160 have as inputs the various output taps from the decade counters 144 and 148. These output taps are chosen in the well-known manner, so as to produce an output signal on line 44 at 15 seconds, 30 seconds and at 31 seconds. It is necessary to produce an enable signal at 31 seconds because the enable signal must be present for 2 seconds after 30 seconds have elapsed. In order to provide the auxiliary timing signals on lines 92 and 94, a dual flip-flop device 162 is provided. As mentioned previously a signal is present on line 92 after 15 seconds and this is accomplished by setting one of the flip-flops with a signal on line 164 produced by an AND gate 166. This AND gate 166 is connected to the decade counters 144 and 146 in such a way to provide an output signal after 15 seconds have elapsed. Similarly, the second half of the dual flip-flop 162 is set directly by a signal from the decade counter 148, which counts in 10 second intervals, after 30 seconds have elapsed. This 30 second signal is also fed on line 40 to the up/down decade counter, 34 of FIG. 2 and acts as the up/down command signal. This is, according to the present invention it is required to count down for the second temperature measurement ($T_2$) at the occurrence of 30 seconds, and the signal on line 40 is this required command.

It should be understood that the details of the foregoing embodiment are set forth by way of example only. Any type of thermistor probe may be utilized and various other logic elements and counters may also be used. Accordingly, it is contemplated that this invention not be limited by the particular details of the embodiment as shown, except as defined in the appended claims.

What is claimed is:

1. An electronic thermometer for producing an estimated final temperature consisting of a means for taking temperature measurements including a temperature responsive element, a means for transforming at first and second predetermined, discrete times said measurements into signals having a variable pulse rate determined by the measured temperatures, a counter means for operating upon said signals in accordance with the algorithm $$T_F = \frac{T_2 - (T_1)e^{-\frac{\Delta t}{\tau}}}{1 - e^{-\frac{\Delta t}{\tau}}}$$

wherein $T_F$ is the final temperature being measured, $T_1$ is the temperature measurement at the first time, $T_2$ is the temperature measurement at the second time, $\Delta t$ is the difference in time between the first and second times, $\tau$ is a thermal time constant which is dependent upon the temperature responsive element and $e$ is the base of the natural log, and means for visually digitally displaying said counter means results, said electronic thermometer further comprising:

control means electrically connected to said transforming means for selectively enabling said transforming means at said first and second predetermined, discrete times and electrically connected to said counter means for controlling said counter to count the pulses of said signals having a variable pulse rate in accordance with said algorithm.

2. The apparatus of claim 1 wherein said control means comprises
   a. crystal oscillator means,
   b. decade counter means electrically connected to said oscillator means for counting the pulses produced by said oscillator means, and
   c. a plurality of logic gate means connected to said counter means for producing output signals after predetermined numbers of pulses have been counted by said decade counter means.

3. The apparatus of claim 2 further including means, connected to said temperature measuring means and said means for transforming, for controlling said variable pulse rate to allow the temperature being measured to be displayed either in fahrenheit units or in centigrade units.

4. The apparatus of claim 3 further including circuitry means connected to said counter means and connected to said display means for selectively disabling the most significant digit of said visual display when said counting means contains a number below a predetermined level.

5. The apparatus of claim 4 further including an electric power source, a power switch means electrically connected to the power source and electrically connected to said plurality of logic gate means for disabling the power source upon the occurrence of a signal from said gate means.

6. The apparatus of claim 5 further including a voltage level indicator connected to said power source and to said visual display means for illuminating said display upon the occurrence of a predetermined voltage level.

7. The apparatus of claim 6 further including means connected to said plurality of gate logic means and to said display means for disabling said visual display means upon the occurrence of a signal from said gate means.

8. The apparatus of claim 7 further including a binary divider electrically connected between said crystal oscillator means and said decade counter means for dividing the oscillator output signal into a pulse signal having a pulse occurring every one second.

9. The apparatus of claim 2 wherein said predetermined numbers of pulses after which said output signals are produced by said plurality of logic gate means comprises 15 pulses, 30 pulses and 31 pulses.

10. The apparatus of claim 9 wherein said predetermined numbers of pulses after which said output signals are produced by said plurality of logic gate means further comprises 40 pulses.

11. The apparatus of claim 10 and further including an electric power source, a power switch means electrically connected to the power source and electrically connected to said plurality of logic gate means for disabling the power source upon the occurrence of said output signal produced after said 40 pulses.

12. The apparatus of claim 3 wherein said means for controlling said variable pulse rate whereby the temperature being measured may be either in fahrenheit units or centigrade units comprises a plurality of variable resistors.

13. The apparatus of claim 3 wherein said means for transforming includes an oscillator the frequency of which is controlled by said temperature responsive element, and said controlling means for allowing display in either fahrenheit or centigrade units includes alternative electrical elements, and a switch means for alternatively electrically coupling said alternative electrical elements to the oscillator, whereby the oscillator oscillates in alternative modes to allow display in either fahrenheit or centigrade units.

14. The apparatus of claim 13 wherein said means for taking temperature measurements includes a probe having said temperature responsive element therein, and some of said alternative electrical elements are located in said probe.

15. The apparatus of claim 4 wherein said predetermined level corresponds to 100° F.

16. The apparatus of claim 1 further including means, connected to said temperature measuring means and said means for transforming, for controlling said variable pulse rate to allow the temperature being measured to be displayed either in fahrenheit units or in centigrade units.

17. The apparatus of claim 16 wherein said means for transforming includes an oscillator the frequency of which is controlled by said temperature responsive element, and said controlling means for allowing display in either fahrenheit or centigrade units includes alternative electrical elements, and a switch means for alternatively electrically coupling said alternative electrical elements to the oscillator, whereby the oscillator oscillates in alternative modes to allow display in either fahrenheit or centigrade units.

18. The apparatus of claim 17 wherein said means for taking temperature measurements includes a probe having said temperature responsive element therein, and some of said alternative electrical elements are located in said probe.

19. An electronic thermometer as set forth in claim 1, and wherein said control means includes means for producing at least one timing signal, whereby the at least one timing signal may be used for some function requiring accurate timing.

20. An electronic thermometer as set forth in claim 19 wherein said means for producing at least one timing signal includes means for producing at least one timing signal after at least one predetermined period of time.

21. An electronic thermometer as set forth in claim 20 wherein said at least one predetermined period of time includes a time period of 15 seconds.

22. An electronic thermometer as set forth in claim 21 wherein said at least one predetermined period of time includes a time period of 30 seconds.

23. An electronic thermometer as set forth in claim 20 wherein said at least one predetermined period of time includes a time period of 30 seconds.

* * * * *